Patented June 2, 1953

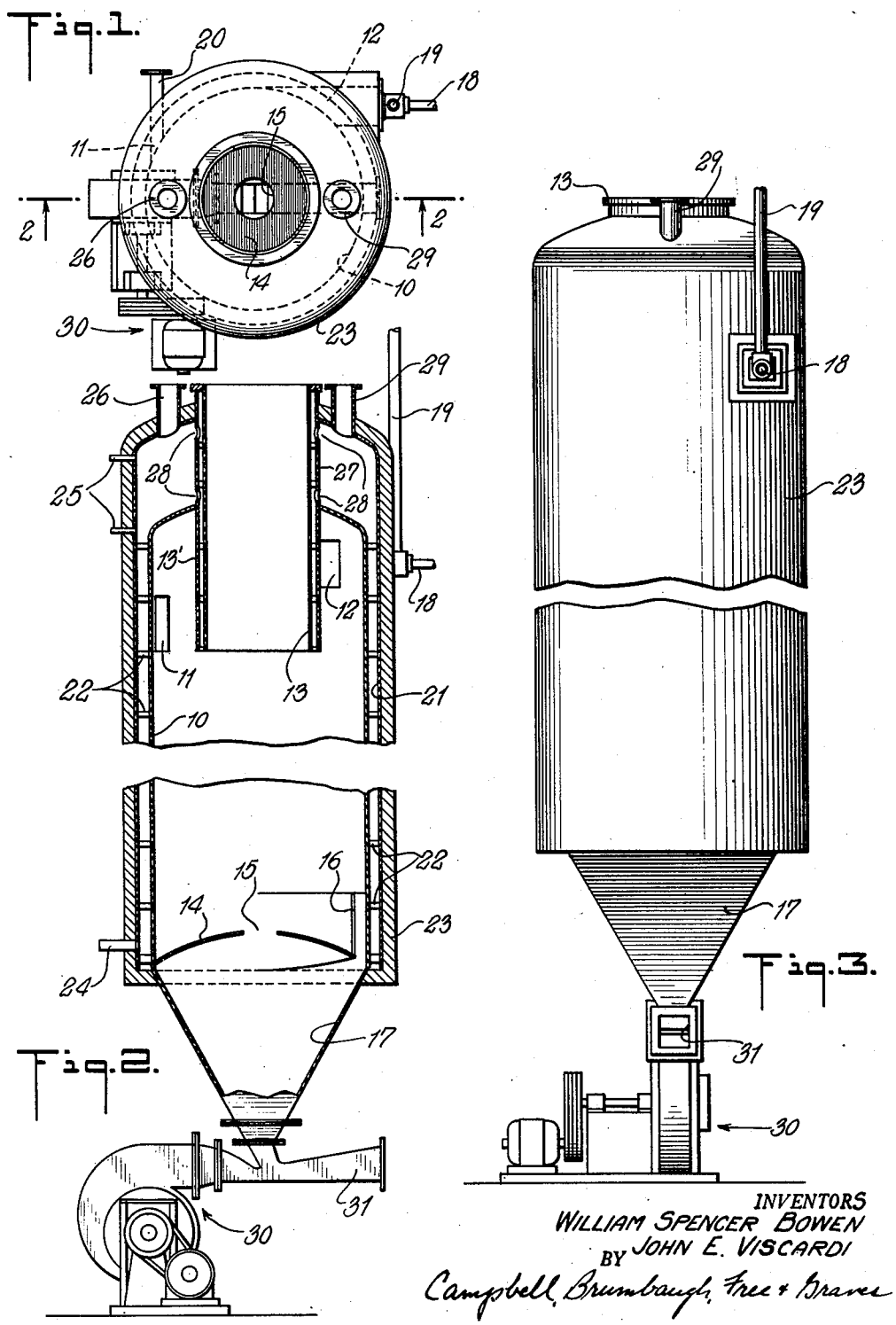

2,640,532

UNITED STATES PATENT OFFICE 2,640,532

REACTION FURNACE AND EVAPORATOR

William Spencer Bowen, Westfield, N. J., and John E. Viscardi, New York, N. Y.

Application October 8, 1949, Serial No. 120,370

2 Claims. (Cl. 159—4)

This invention relates to furnaces and more particularly to furnaces for performing such operations as evaporating aqueous waste products, reducing ores and reacting certain materials under the influence of heat.

The efficiency of high speed evaporation and reaction furnaces used in the treatment of various materials is, as a general rule, dependent upon the intimacy, uniformity and speed with which the materials being treated can be exposed to the action of thermal gas or other treating media within the evaporating or reacting chamber. Thus, if a relatively large amount of heat can be imparted to a given material within a relatively short time interval, the size of the furnace may be materially decreased in proportion to its output.

Accordingly, it is an object of this invention to provide a furnace for performing various reducing and evaporating operations in relatively short time intervals in relation to the size of the furnace.

It is another object of the invention to provide a furnace for use in the treatment of waste products such as sewage sludge whereby the evaporation of large quantities of water and the incineration of solids contained therein may be accomplished in such a way as to preclude the formation of odorous gases and to prevent ash deposits from reaching the atmosphere.

It is a further object of the invention to provide a reaction furnace useful in a continuous system for preparing metal from ore.

According to the invention, a furnace is provided in which high-velocity, unidirectional vortices of flame and finely divided particles of solid material are established within an upright cylindrical combustion chamber. This is accomplished by injecting fuel tangentially in the upper reaches of the chamber to establish a descending flame vortex therein, and tangentially injecting, preferably at a point beneath that of the fuel injection, finely divided materials to be evaporated or treated within the chamber to provide a second descending vortex moving in the same angular direction as the flame vortex and intimately commingling therewith to form a single descending vortex, wherein any relatively dense particles are segregated toward the wall by tangential force for removal through a lateral skimming slot at the bottom.

Additional objects and advantages of the invention will become apparent from the following detailed description of a furnace formed according to the invention and taken in conjunction with the accompanying drawings, in which:

Fig. 1 is a top view of a furnace with its external structural supports removed;

Fig. 2 is a cross sectional side view of the furnace taken along line 2—2 of Fig. 1; and Fig. 3 is a view in side elevation of the furnace.

The illustrated furnace as formed according to the invention includes an upright cylindrical reaction or evaporation chamber 10 having at its upper end a pair of vertically and circumferentially spaced tangential inlet ports 11 and 12. A cylindrical flue portion 13, in axial alignment with the cylindrical chamber 10, is provided at the upper end of the chamber and extends downwardly to a point adjacent the lower, tangential inlet port 11.

The lower end of the reaction chamber is provided with a preferably arched or convex floor portion 14 having an aperture 15 on the axis or center line of the chamber. A peripheral skimming slot 16 opening against the movement of the commingled vortices is formed in the wall of the chamber at its lower end, and is adapted to discharge into a receptacle or hopper 17 disposed beneath the reaction chamber. The receptacle 17 has as its roof portion the apertured floor portion 14 of the reaction chamber, thus providing for communication between the receptacle and the axial center of the combustion chamber.

Fuel such as gas or oil, for example, from a conduit 18, is forcibly injected tangentially through the upper inlet port 12 into the chamber. Air or oxygen enriched air from a conduit 19 may also be introduced into the chamber concurrently with the fuel through the inlet port 12. The high-velocity, tangential injection through the port 12 sets up a descending flame vortex within the chamber.

When the furnace is used as a dehydrating unit for various waste materials, such as watered sludge for example, the material is forcibly injected from conduit 20 tangentially into the chamber through the lower port 11 in the form of a spray thereby to provide a descending vortex moving in the same angular direction as and commingling with the flame vortex. The material entering through the port 11 is preferably finely divided so that relatively large surface areas are presented to the flames to increase the rate of evaporation or reaction.

Because the fuel inlet port 12 is disposed above the material inlet port 11 a "flame roof" is established in the upper end of the chamber which tends to prevent premature chilling of the flame.

The cylindrical flue portion 13, extending downwardly into the chamber 10, assists in the formation and shaping of the respective vortices which eventually become intimately commingled during the helical descent to the lower end of the chamber due to relatively high centrifugal forces which drive the particles and gases toward the walls of the chamber.

The united or commingled vortices engage the skimming slot 16 and residual solids such as ash, together with a portion of the gases are channelled into the lower receptacle 17. As described, the receptacle 17 is vented through the aperture 15 to the center line of the chamber 10 which is coextensive with the core of the vortices formed within the chamber. The vortices thus produce a low static head along the axis of the chamber, whereas a high static head is formed at the peripheral skimming slot. A flow is thus set up within the lower receptacle from the point of discharge of the skimming slot inwardly to the aperture 15. The gases, in which a quantity of dust-like particles may be entrained, rise upward through the aperture 15 along the axis of the chamber wherein the particles are eventually drawn into the vortices and again subjected to the action of the thermal fluid. By making the vertical height of the chamber of sufficient length with respect to the diameter, particles will be caught in the vortex before leaving the chamber through the flue portion 13 disposed at its upper end, it having been found that a ratio of chamber length to internal diameter of between 2 and 4 gives serviceable results. Accumulated solids in the receptacle 17 may be drawn off by an aspirator 30 through a conduit 31.

In order to encourage high vortex velocities within the reaction chamber, the walls thereof are preferably smooth to present minimum impedance to the flow. Accordingly, a metal walled chamber is preferable, and to protect the metal walls from overheating and help to maintain given temperature conditions of the gases formed within the chamber and discharging through the flue, a water jacket may be provided comprising an outer shell 21 encasing the inner shell 10. A plurality of through-bolts 22 are provided to maintain proper rigidity and spacing of the shells. The entire unit may then be encased by suitable lagging or insulation 23.

An inlet conduit 24 is provided for filling the water jacket, and water gauge connections 25 may be provided as the upper end thereof. A safety valve connection 26 may be provided, if required, to insure against the development of unsafe pressures within the jacket. The flue portion 13 is likewise provided with a water jacket formed by the inner shell or wall 13 and an outer shell 27. Apertures 28 are provided in the upper end of the shell 27 to permit a free passage of water from the water jacket surrounding the chamber 10.

An outlet pipe 29 is provided at the upper end of the chamber for taking off steam or heated water generated within the water jacket. This steam or heated water, representing waste heat, may be utilized in certain instances in preheating or treating material injected into the furnace.

In utilizing the furnace as an evaporator for treating sewage sludge, for example, the effluent exhaust gases may be kept odorless by maintaining the chamber temperature in the range of 1500° F., this temperature being controlled by the fuel oil input and feed input, and by the amount of heat extracted by the aforedescribed water jacket system.

If the furnace is utilized for reducing ores such as iron ore, the ore is first finely divided and then injected tangentially into the furnace through inlet 11 with carbonaceous powdered or liquid fuel such as powdered peat or fuel oil. Initial heat is applied to the furnace by means of a suitable fuel burner through the tangential inlet 12. Molten iron is then accumulated at the bottom of the chamber, from which point it may be drawn off continuously into the slag separating receptacle (not shown). Oxygen in the ore is removed and discharged through the flue 13 as $CO_2$. Molten iron free of slag is then passed alternately into two electrical or open hearth furnaces for further purification of the metal, one emptying and filling while the other operates. Thus, the making of steel may be a continuous operation from the ore to the finished product.

From the foregoing it will be apparent that the invention provides a new and improved furnace utilizing a novel arrangement of components to provide for highly effective intermixing of fluidized solids and thermal fluids within the combustion chamber and for efficient separation of treated solids from the gases after the reaction period.

It will be understood that the several embodiments described by way of illustration may be modified within the spirit of the invention and the embodiments described, therefore, are not to be regarded as limiting in any way the scope of the following claims.

We claim:

1. In a cyclone furnace, in combination, a vertical axis combustion chamber having a substantially circular cross section, fuel injection means for establishing a descending flame vortex within the chamber, material injection means for establishing a descending vortex of material to be treated, said flame and material vortices moving in the same angular direction, an axially disposed flue at the upper end of the chamber, a peripherally disposed skimming slot at the lower end of the chamber, a receptacle disposed beneath said combustion chamber adapted to receive the discharge from said skimming slot, a roof-portion for said receptacle having an opening communicating with the lower end of the combustion chamber on the axis thereof to permit a flow of material from said receptacle upwardly into the low static head created along the axis of said chamber by said vortices.

2. A furnace including a vertically disposed combustion chamber having a substantially circular cross section, first means including fuel-supplying means and inlet means for injecting fuel tangentially into the chamber in the upper portion thereof to form a descending flame vortex therein, second means including material-supplying means and inlet means disposed below said first means for tangentially injecting material to be treated into the chamber to form a descending vortex moving in the same annular direction as the flame vortex, said descending vortices being commingled within the chamber, the upper portion of the flame vortex being disposed above said second means to provide a flame-roof overlying the injected material, a peripheral skimming slot disposed at the lower end of said chamber, receptacle means communicating with said skimming slot, a floor portion in said combustion chamber having a central opening therein communicating with said receiving chamber, said opening being disposed on the center line of the vortex established within the chamber, and flue means disposed at the top of the chamber coaxially with respect to said vortex.

WILLIAM SPENCER BOWEN.
JOHN E. VISCARDI.

References Cited in the file of this patent

UNITED STATES PATENTS

| Number | Name | Date |
|---|---|---|
| 274,048 | Stilwell | Mar. 13, 1883 |
| 861,593 | De Laval | July 30, 1907 |
| 1,722,175 | Bowen | July 23, 1929 |
| 1,799,643 | Rogers | Apr. 7, 1931 |
| 2,184,300 | Hodson et al. | Dec. 26, 1939 |
| 2,287,476 | Hodson et al. | June 23, 1942 |
| 2,365,194 | Hodson et al. | Dec. 19, 1944 |
| 2,445,327 | Keith | July 20, 1948 |
| 2,506,646 | Komline | May 5, 1950 |
| 2,530,077 | Ramsing | Nov. 14, 1950 |